June 26, 1951 E. G. HILLS 2,558,487

MULTIFREQUENCY TUNABLE ANTENNA

Filed June 28, 1949

INVENTOR.
Elmer Guy Hills,
BY
Mason, Kolehmainen, Rathburn & Wyss
Attys.

Patented June 26, 1951 2,558,487

UNITED STATES PATENT OFFICE 2,558,487

MULTIFREQUENCY TUNABLE ANTENNA

Elmer Guy Hills, Chicago, Ill., assignor of one-half to Joseph N. Marks, Julius Tunkl, I. Rosenthal, and E. Lichtenstein, doing business as Tricraft Products Co., Chicago, Ill.

Application June 28, 1949, Serial No. 101,765

1 Claim. (Cl. 250—33)

The present invention relates to a multi-frequency antenna tunable to receive various frequencies, and more particularly to an antenna especially adapted for use as an indoor television antenna capable of being readily orientated and tuned to any desired television channel.

Receiving antennas for television signals, as is well understood by those skilled in the art, are far more critical than those for audience sound broadcasting. The principal problem in connection with television receiving antennas resides in the avoidance of reflected signals either from near-by structures or within the antenna system itself. Consequently television antennas are generally designed so that the path difference with respect to reflected or direct television signals reaching the antenna can not be greater than 50 feet. If the path difference is greater than 50 feet a substantial degradation of the picture detail results, and if the path difference is sufficiently great a double image results. This fact makes the conventional type of long wire receiving antenna and the conventional lead-in wire unsatisfactory since such conventional antennas are often sufficiently long to allow reflections whose path differences are much longer than 50 feet. Reflections can of course be prevented by proper design and by loading the antenna. But where the antenna is used for reception from different channels it is impractical to prevent reflections on any but one of these channels. Consequently television receiving antennas usually comprise a short dipole and the lead-in conductor takes the form of a transmission line that has no signal pick up. The signal absorption is thereby restricted to the dipole element within which significant signal reflections do not occur.

Even when employing merely a single dipole or some modification thereof television antenna installations have been fairly complicated and expensive, and as was the case more than a decade ago with respect to antennas for standard broadcast receivers, there is today considerable agitation for indoor antennas for television receivers. This is particularly true of people who move often and who obviously do not wish repeatedly to incur the relatively great expense of a television antenna installation at each new location. Furthermore landlords often refuse to permit the installation of the type of antennas required for television reception. Also, in connection with apartment buildings and the like, it has been found difficult if not impracticable to erect individual antennas for each individual receiver. Accordingly there have been proposed indoor television antennas. One of the most common of these indoor television antennas comprises two individual telescoping rods generally arranged in a V, each of which forms one element of a half-wave dipole. The length of these rods must be adjusted for the proper wave length depending upon the particular television channel which it is desired to receive. In addition the antenna must be orientated for proper direction and polarization since it is well understood that the dipole has a normally figure eight reception pattern, and if not properly orientated it is possible that no signal will be received or at best a very poor signal.

In most of the indoor television antennas now available adjustment to resonance is obtained by trial and error, in correctly choosing the length of each of the dipole elements of the half-wave dipole. This has been found to be very unsatisfactory since the capacity of the operator's hand in making such an adjustment causes great error and when the hand is removed a substantial change in the operation of the antenna results. Furthermore in the lowest frequency television channel, which is customarily referred to as chan nel 2, the half-wave dipole when properly tuned to resonance must have an over all length of about nine feet. Obviously such a nine-foot antenna can not be orientated readily in an ordinary home unless the antenna is located in the central part of the room. Usually this is not the case and as a result the antenna is both improperly orientated and improperly tuned and the user thereof has been very much dissatisfied with most heretofore available prior art antennas.

Conventional television receivers generally employ a 300 ohm transmission line, and with such a 300 ohm transmission the use of the single dipole would at best produce a four to one impedance miss match even when the dipole elements have the proper length for a half-wave dipole, and furthermore only when the two dipole elements are colinear instead of arranged in the conventional V. It will be understood that the V form is used to permit more ready orientation since when the dipole elements are extended there is usually more space available in the room in an upward direction than in a lateral direction from the antenna.

It is a well known fact that the radiation and reception pattern of a dipole of zero length is so similar to that of a half-wave dipole that the gains are only about one-third of a decibel apart, in favor of the half-wave dipole. By decreasing the dipole length two things occur. First, the reactive component of the input impedance becomes capacitive and increases as the length of the antenna decreases. Secondly, the input resistance becomes vary small with a decrease in the dipole length. By a proper matching network this complex input impedance can be transformed to a pure resistance of 300 ohms. The band width decreases with a decrease in length of the dipole and varies as the cube of the dipole length for short lengths thereof.

From the above discussion it is quite apparent that the prior art types of indoor antennas mentioned above are entirely incapable of being disposed within the cabinet of a portable or table model television receiver and in many cases are incapable of being disposed within console type television cabinets. It would be desirable however to provide an indoor television antenna which is capable of being disposed within the receiver cabinet in somewhat the manner in which built in antennas of certain broadcast receivers are employed. In fact it would be desirable to have built in tunable antennas which are tunable to the proper channel from the front of the receiver cabinet.

Accordingly it is an object of the present invention to provide an improved multi-frequency antenna especially adapted for indoor use, which is inexpensive to manufacture, foolproof in operation from both a tuning and orientation standpoint, and of sufficiently small size so that it may be properly tuned and oriented to any one of the television channels.

It is a further object of the present invention to provide an improved indoor antenna for television receivers which may readily be adjusted to the desired television channel and properly oriented for most efficient reception without being adversely affected by hand capacity of the operator making the adjustment.

Still another object of the present invention is to provide a compact inexpensive indoor television antenna which may be disposed within the cabinet of most television receivers and which is adapted to be built into such units at the factory.

A further object of the present invention is to provide an indoor television antenna which is quickly tunable to a television channel, readily orientated with respect to this channel, and furthermore matched to the receiver input.

Further objects and advantages of the present invention will become apparent as the following description proceeds, and the features of novelty which characterize the invention will be pointed out with particularity in the claim annexed to and forming a part of this specification.

For a better understanding of the present invention, reference may be had to the accompanying drawing in which.

Figures 1, 2, 3, 4:
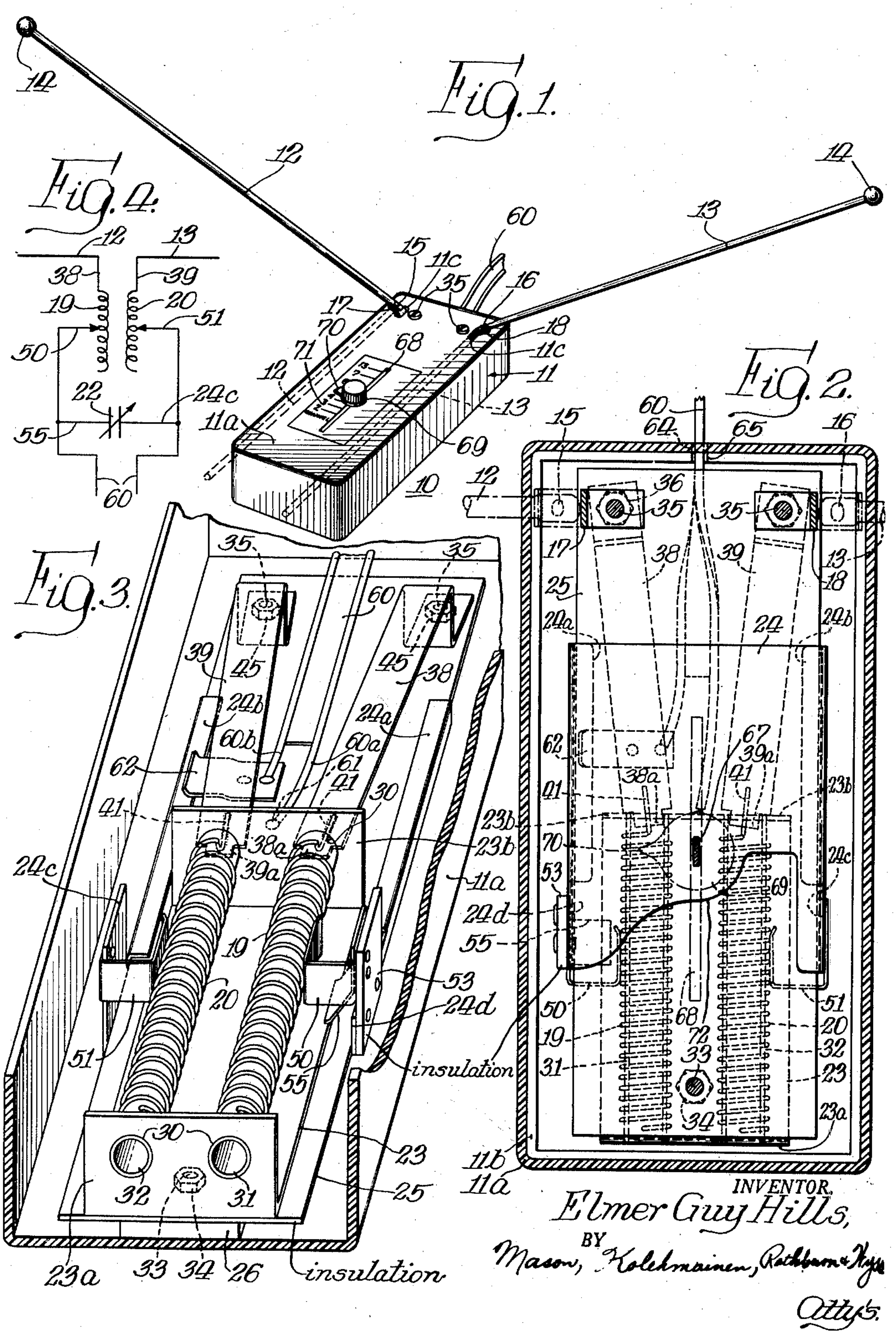
Fig. 1 is a perspective view of a tunable multi-frequency antenna embodying the present invention.
Fig. 2 is an enlarged top view of Fig. 1 with certain portions thereof cut away more clearly to illustrate the invention.
Fig. 3 is an enlarged perspective partial sectional view of the bottom of the antenna as viewed in Fig. 1.
Fig. 4 is a schematic circuit diagram of the electrical circuit of the antenna of the present invention.

Referring now to the drawing there is indicated a multi-frequency tunable antenna generally designated at 10 which is illustrated as comprising a housing 11, of the relatively small size to which are attached dipole elements 12 and 13. The housing 11 may comprise a small box-like container formed of any suitable material having telescoping sections 11*a* and 11*b* quite similar except for size to a conventional "shoe box."

The dipole elements 12 and 13 are illustrated as comprising rod-like conductors of the order of a foot or so in length to the ends of which for ornamental purposes are attached the spherical members 14. These spherical members 14 furthermore are a safety feature in preventing injury to any one coming in contact with the ends of the rodlike dipole elements 12 and 13. The dipole elements 12 and 13 are pivotally supported as indicated at 15 and 16 respectively to suitable conductor extensions 17 and 18 respectively extending outside of the housing 11 through slits 11*c* defined in housing portion 11*a*. With this arrangement the dipole elements 12 and 13 may be folded back against the top section 11*a* of the housing 11 as shown in dotted lines in Fig. 1 when not in use so as to take up a minimum of space. In a commercial embodiment constructed in accordance with the present invention the over all spacing between the spherical members 14 when in the solid line position shown in Fig. 1 is of the order of two feet while the housing 11 is of the order of three by six by one and one-half inches. It is quite apparent that such a housing 11 and attached dipole elements 12 and 13 can readily be placed in any position in the room.

Due to the figure eight reception pattern of a dipole antenna of the type shown in Fig. 1 it is apparent that the antenna must be oriented for most effective reception and this is normally accomplished by trial and error while the television receiver is turned on by rotating the entire housing 11 until the best results are obtained. Due to the tendency to locate television transmitting antennas in any particular location in a rather confined area, once the receiving antenna is properly orientated for a particular channel it will generally also be properly orientated for most other channels. This is not true, however, for television receiver locations which, for example, are half way between two transmitting stations.

It will be apparent that the small size of the antenna 10 permits it to be readily rotated or orinented in any direction while preferably being disposed on the television cabinet itself. If the antenna 10 is built into the television cabinet the housing 11 preferably becomes a physical part of the receiver and in such case the dipole elements 12 and 13 will be arranged to be rotatable relative to the housing 11 for selective orientation thereof. This can readily be accomplished by making the conductor elements 17 and 18 rotatable relative to the housing 11.

From the above description it will be understood that the dipole elements 12 and 13 are not long enough to function, without more, as a half-wave dipole and be resonant to the television channel of lowest frequency (channel #2), since this would require a nine-foot over all length, and accordingly it is necessary to provide means for selectively tuning the antenna for the different frequencies. In accordance with the present invention the dipole elements 12 and 13 are chosen to be of sufficiently short length as never to be inductive. As is well known, the shorter the dipole length the more capacitive the antenna effectively tends to be.

For the purpose of providing the necessary means for selectively tuning the antenna 10 to the various television channels, there are disposed within the housing 11 a pair of inductors or windings 19 and 20 and a variable capacitor schematically designated in Fig. 4 by the reference numeral 22 and specifically defined by a pair of spaced conducting plates 23 and 24 as shown in Figs. 3 and 4, separated by an insulating supporting plate 25 which also functions as the dielectric of the capacitor 22. The support 25 may be formed of any suitable insulating material and is preferably attached to the inside of the top surface of the housing section 11a in spaced relationship therewith. To this end insulating spacer members 26 formed of cardboard or the like are employed whereby the insulating support 25 is preferably disposed parallel to the top surface of the housing 11 and spaced therefrom sufficiently to receive within this space the condenser plate 24 which plate is movable relative to the suppport 25 and is referred to hereinafter as the movable condenser plate.

To support the inductors 19 and 20 in spaced and insulated relationship the condenser plate 22 which, as will become apparent from the following description, is a fixed plate is provided with depending end flanges 23a and 23b. Each of these flanges is provided with a pair of spaced openings 30 therein to receive the opposite ends of a pair of tubular insulating supporting members 31 and 32 upon which the inductors 19 and 20 are wound as is clearly shown in Fig. 3 of the drawing. The fixed or stationary condenser plate 23 is suitably fastened to the insulating support 25 by rivets or the like. If desired a suitable fastening means such as a bolt 33 and a nut 34 may be provided to fasten together the condenser plate 23, one end of the insulating support 25, one of the spacers 26, and the top section 11a of the housing 11 as a unit. The other end of the insulating support 25 is preferably fastened to the top housing section 11a and in spaced relationship thereto by suitable fastening means comprising screws 35 and nuts 36 which also preferably fasten the dipole element supports 17 and 18 to the housing section 11.

In order to connect the inductors 19 and 20 with the dipole elements 12 and 13, one end of the inductor 19 is connected by means of a relatively large conductor 38 to the conducting support 17 for the element 12 and the corresponding end of the inductor 20 is similarly connected by a relatively large conductor 39 with the conducting support 18. The electrical connections between the conductors 38 and 39 and the respective inductors or windings 19 and 20 are preferably soldered connections as indicated at 41. To insure a satisfactory mechanical support for the ends of the heavy conductors 38 and 39 adjacent the inductors 19 and 20 these ends are provided with somewhat narrow tongue portions 38a and 39a respectively which are insertable into the ends of the supporting tubes 31 and 32 for mechanical support, whereby the soldered connections 41 are never subjected to strain. The other ends of the conductors 38 and 39 are each provided with a pair of right angle bends which furnish a vertical support and a supporting surface whereby these ends of the conductors 38 and 39 may be supported from supporting member 25 with the major portion of these conductors spaced therefrom. Additional nuts 45 on the screws 35 may be employed to mechanically support the conductors 38 and 39 and electrically connect them to the members 17 and 18 respectively. The reason that conductors 38 and 39 are illustrated as relatively large conductors is to reduce to a minimum the inductance of the antenna circuit when the inductors 19 and 20 are effectively eliminated therefrom as will become apparent from the following description, which is when the antenna is tuned to the high frequency end of the television band. As was pointed out above it is desirable that the antenna never be inductive on any channel even including the highest frequency channel.

For the purpose of selectively connecting desired predetermined portions of the inductors 19 and 20 into the antenna circuit in dependence upon the particular television channel to which the receiver is to be tuned there are provided a pair of U-shaped sliding contacts 50 and 51 preferably formed of resilient conducting material adapted to have one leg of the U disposed to slidingly and selectively engage the turns of the inductors 19 and 20 respectively which inductors are formed of a plurality of spaced turns of bare wire suitably wound on the supports 31 and 32. Since the adjustment of the portions of the inductors 19 and 20 which are desired to be rendered effective must be made simultaneously with the adjustment of the capacitance of the capacitor 22, the U-shaped contacts 50 and 51 are illustrated as being supported for movement with the movable plate 24 of the condenser 22. As specifically illustrated in the drawings the condenser plate 24 is provided with a pair of edge flanges 24a and 24b disposed so as to receive the insulating support 25 between these flanges and the main part of the condenser plate 24. With this arrangement the condenser plate 24 is slidably mounted on the insulating support 25 in the space defined by the spacer plates 26 for movement relative to the stationary condenser plate 23. The U-shaped contact 51 is supported from a lateral flange 24c integral with the condenser plate 24 thereby also serving as an electrical conductor connecting the condenser plate 24 to a selected point on the inductor 20. The U-shaped sliding contact 50 on the other hand is supported on an insulating member 53 which in turn is fastened to a lateral flange 24d on the condenser plate 24. Thus the sliding contact 50 is insulated from condenser plate 24. For the purpose of connecting the sliding contact 50 with the fixed condenser plate 23 in all positions of the sliding contact 50 there is provided a contact brush 55 electrically connected to the U-shaped contact 50 and supported by the insulating member 53. This contact brush 55 slidably engages the fixed condenser plate 23 thereby completing the electrical connection between the inductor 19 and the condenser plate 23.

In order to connect the antenna to an associated television receiver there is provided a suitable transmission line 60 which is illustrated as being connected to the antenna 10 in a manner to feed the dipole comprising elements 12 and 13 at the center. As illustrated one conductor 60a of the transmission line 60 is connected as indicated at 61 to the fixed plate 23 of the condenser 22 and consequently also to the inductor 19 through sliding contact 50. The other conductor 60b is connected to the movable plate 24 of the condenser 22 by means of a brush contact 62 fixedly mounted on the insulating support 25 and electrically engaging the flange 24b of the sliding condenser plate 24. The transmission line 60 is preferably a 300 ohm transmission line and should be as short as possible to complete the connection to an associated television receiver. In order that the transmission line 60 may enter the housing 11 the top section 11a of the housing is provided with a suitable elongated opening 64 and the bottom section 11d is provided with an elongated slot 65.

For the purpose of readily tuning the antenna 10, the sliding plate 24 of the condenser 22 and the associated sliding contacts 50 and 51 are arranged to be selectively moved by means actuated from outside the housing 11. To this end the condenser plate 24 is provided with a vertical extension 67 which extends through a slot 68 in the top section 11a of the housing 11. To this extension 67 is preferably attached a tuning knob 69 having a suitable pointer 70 cooperating with a scale or suitable indicia 71 indicating the television channels to which the antenna 10 may selectively be tuned.

It will be understood that the capacitance of the capacitor 22 must have a predetermined desired value for each tuning position thereof to insure proper tracking. Accordingly, the condenser plate 24 is provided with an end surface 72 of a predetermined configuration designed to give the necessary capacitance in all tuning positions. The shape of the capacitor plate 24 may initially be determined mathematically or by trial and error.

In Fig. 4 of the drawing there is schematically illustrated the electrical circuit of the antenna 10, and the corresponding parts are designated by the same reference numerals as in the other figures of the drawing. It will be apparent that simultaneous adjustment of the effective inductance of inductors 19 and 20 and the capacitance of the capacitor 22 is accomplished merely by movement of the control knob 69. It will be understood that the antenna 10 as schematically shown in Fig. 4 might equally well comprise a circuit in which a pair of variable capacitances corresponding to the inductors 19 and 20 are provided and a single variable inductance corresponding to the capacitance 22 is provided. From the above description it will also be apparent that the inductors 19 and 20 are connected to the dipole elements 12 and 13 at an equi-potential point so that hand capacity of the operator in adjusting the antenna will have no effect as contrasted with prior art arrangements where it was necessary to grasp directly the dipole elements for adjustment thereof with the consequent deleterious effect of hand capacity in tuning the same. When the knob 69 is moved to its position most remote from the dipole elements 12 and 13 the antenna has the maximum inductance of the inductors 19 and 20 connected in the circuit, which corresponds to the television channel of the lowest frequency presently designated as television channel No. 2. At this lowest frequency channel the movable condenser plate 24 is in its position to provide the maximum capacitance. If the tuning knob 69 is moved toward the end of the housing 11 to which the dipole elements 19 and 20 are attached, smaller and smaller quantities of effective inductance of the inductors 19 and 20 are connected in series with the dipole elements.

From the above discussion it will be apparent that the antenna 10 has numerous advantages over prior art arrangements particularly with respect to the simplicity of manufacturing and assembling the same as well as the low cost thereof. The electrical conductor elements, except for the inductors 19 and 20, may comprise metal stampings which are readily made and rapidly assembled. The antenna may be also adjusted readily to the desired channel and in the case of newly manufactured receivers may be built right into the set with the antenna tuning knob at the front of the cabinet and the dipole elements 12 and 13 mounted for rotation relative to the housing portion 11 for orientation thereof. The band width of the antenna 10 is fairly narrow at the low frequency end of the band but by providing a separate adjustment for each channel satisfactory operation is readily obtainable with the inductance and capacity of the circuit simultaneously varied. At each tuning position the inductance of the inductors 19 and 20 connected in series with the antenna elements 12 and 13 is large enough to more than tune out the capacitive reactance of the dipole, with the result that the antenna appears like an inductance in series with a small radiation resistance. By shunting this combination with the capacitor 22 as is the case there is provided a very low Q parallel resonant circuit with a parallel impedance of 300 ohms to match the 300 ohm transmission line. All of the effective impedance in the antenna circuit is due to the radiation resistance of the dipole.

In view of the detailed description the operation of the multi-frequency tuning antenna of the present invention will be readily understood by those skilled in the art and no further discussion thereof is included herein.

Although a specific embodiment of the multi-frequency tuning antenna of the present invention has been illustrated and described it will be understood that various changes and modifications will occur to those skilled in the art, and it is aimed in the appended claim to cover all such changes and modifications as fall within the true spirit and scope of the present invention.

What is claimed as new and desired to be secured by Letters Patent of the United States is:

In a multi-frequency television antenna especially adapted for indoor use comprising a pair of rod-like conductor elements arranged as a dipole but of such short length as never to be inductive for any signal frequency likely to be received by said antenna, a box-like insulating support having no dimension greater than a fraction of the length of one of said elements, a matching network for selectively tuning said antenna to a plurality of different signal channels comprising a variable capacitor and a pair of inductors, an insulating member disposed within said support, said capacitor comprising a fixed plate fastened to one side of said member and a movable plate slidably mounted on the other side of said member whereby said member in addition to functioning as a support also functions as the dielectric of said capacitor, a pair of insulating tubes supported in spaced parallel relationship from said fixed plate, said inductors being wound one on each of said tubes, means for connecting one end of each of said inductors to equipotential points one on each of said elements, a transmission line, sliding contact means engageable with said inductors for connecting the ends of said transmission line to predetermined selected points on said inductors, means for connecting said capacitor across said transmission line, and manually actuable means disposed outside said box-like support for simultaneously varying the effective inductance of said inductors and capacitance of said capacitor selectively to tune said antenna to receive signals from signal channels of different predetermined frequencies.

ELMER GUY HILLS.

REFERENCES CITED

The following references are of record in the file of this patent:

UNITED STATES PATENTS

| Number | Name | Date |
|---|---|---|
| D. 158,233 | Trowbridge | Apr. 18, 1950 |
| 2,129,514 | Wertheimer | Sept. 6, 1938 |
| 2,229,078 | Hansell | Jan. 21, 1941 |
| 2,258,406 | Carter | Oct. 7, 1941 |
| 2,259,628 | Fener | Oct. 21, 1941 |
| 2,311,364 | Buschbeck et al. | Feb. 16, 1943 |
| 2,313,046 | Bruce | Mar. 9, 1943 |
| 2,351,723 | Vogel | June 20, 1944 |
| 2,438,116 | Dodds | Mar. 23, 1948 |
| 2,469,168 | Loughlin | May 3, 1949 |